United States Patent Office 3,597,221
Patented Aug. 3, 1971

3,597,221
CHILLPROOFING OF BEVERAGES USING BASIC POLYMER PRODUCTS
Kurt A. Ladenburg, St. Louis, Bernard W. Weinrich, St. Charles, and John H. Johnson, Kirkwood, Mo., assignors to Monsanto Company, St. Louis, Mo.
No Drawing. Filed Sept. 27, 1968, Ser. No. 763,383
Int. Cl. A23i 1/02; C12h 1/04
U.S. Cl. 99—48
19 Claims

ABSTRACT OF THE DISCLOSURE

Improved process for chillproofing of beverages, especially malt beverages, using insoluble basic polymer products, wherein components of said beverages which lead to chill-haze and oxidative instability upon aging are removed from the beverage through a process of specific sorption while leaving flavor components in said treated beverage. Provides improved chillproofing stability, color, clarity and taste in the beverage treated; beverages chillproofed in this manner.

FIELD OF INVENTION

Chillproofing of beverages; improved efficiency and product quality.

PRIOR ART

Chillproofing of beverages dates back to the early 1900's and in the case of beer is summarized in a series of patents (U.S. 995,820; 995,823–995,826) and in a paper presented at the Proc. 2nd Intl. Brewers Congress, Chicago, I, 294 (1911). These reported studies introduced the concept of enzyme treatment for clarification of beer. More recent reviews include: Wallerstein Lab. Communications 24, No. 84, 158–168, 232–242 (1961) with particular reference to page 160; "Some Physical and Chemical Properties of Commercial Chillproofing Compounds," H. E. Weissler and A. C. Garza, Ann. Proc. Am. Soc. Brewing Chemists, 1965, pp. 225–238. Further related enzyme treatment is found in U.S. 3,055,757 (i.e., use of chitinase). Reduction of haze-forming compounds by adsorption of said compounds on polyvinylpyrrolidone is also reported, U.S. 3,117,004. The subject is further reviewed in sections of several books: "Enzymes in Food Processing," Gerald Reed, editor, Academic Press, New York (1966), pp. 339–344; "Handbook of Food Additives," Thomas E. Furia, editor, The Chemical Rubber Co., Cleveland, Ohio (1968), p. 87; and "Encyclopedia of Chemical Technology," Kirk-Othmer, 2nd ed., vol. III, pp. 297–338 (1965).

SUMMARY OF THE INVENTION

The invention relates to use of improved polymeric compositions for the unpredictably selective removal, via sorption mechanism, of haze-forming components and metal ion contaminants present in fermented malt beverages and other nondistilled alcoholic beverages while leaving flavor components essentially intact. This provides a stabilized beverage with enhanced appearance and improved flavor at the time of use. Current enzyme treatments leave active enzyme in the product which may have deleterious effects and which in any event present another active entity, namely, the enzyme, for intake into the human body. Current treatments with polyvinylpyrrolidone are only moderately effective in removing chill-haze components. The present invention relates to utility of insoluble basic polymer products which surprisingly provide vastly improved sorption and specific sorption treatment of beverages. It relates to new and improved beverages based on the ability to remove substantially all of the haze-producing components and destabilizing metals and to leave the free from other contaminants such as may arise from conventional treatments.

Conventional treatments of malt beverages with enzymes serve primarily to break down the protein components of the beverage which, if not broken down or removed, will combine with other ingredients, including tannins, to form chill-haze. In these treatments, enzyme residues and protein degradation products remain in the beer and contribute to off-flavors. Use of polyvinylpyrrolidone for adsorbent treatment removes some, but not all, of the haze components. The present invention utilizes polymers which, via the sorption mechanism, remove sufficient chill-haze components, both tannins and metal ions, such that unexpected and vast improvements in chill-haze stability, as compared to conventional treatments, are noted. The taste of the ultimate beverage chillproofed according to the present invention is improved when compared to beverages with residual contaminants as noted above.

Since the chillproofing agents of the invention are insoluble, they can be completely removed from the beverage, leaving the beverage free of foreign proteins and peptides which are non-indigenous to the beverage by its very nature and which are introduced by conventional enzyme treatment. However, it is obvious that, in cases where producer or consumer demands require some type of enzyme treatment, e.g., pepsin, as a digestant or for some other reason, the introduction of such further ingredient into the beverage at any suitable stage of its production before packaging is a simple expedient.

OBJECTS

The objects of the instant invention include the provision of a process for the production of non-distilled alcoholic beverages which have improved initial clarity and color and which retain clarity upon chilling, even after periods of prolonged aging, while at the same time possessing improved characteristics including improved oxidative stability and a further improved flavor, apparently resulting from absence from the product of contaminants inherent in the treating process, and beverages produced in this manner. Other objects will become apparent hereinafter, and still other objects will be obvious to one skilled in the art.

GENERAL DESCRIPTION OF INVENTION

Fermented malt beverages such as beer and ale are today widely distributed in convenient individualized containers such as glass bottles and cans. Such containers, of course, are subject for varying lengths of time to a wide variety of temperature and other storage and shipping conditions that might adversely affect their contents. In addition, variable amounts of air, which appears to have a particularly deleterious effect on the stability of malt beverages, may enter the container during filling, thereby resulting in a reduction of the normal shelf-life of the beer and in the production of haze and turbidity. Contamination by trace metals (e.g., iron and copper salts) also adversely affects beer stability.

It is, of course, necessary in order to obtain consumer acceptance, that the individual containers of malt beverage yield upon opening a product that is brilliant in visual appearance and pleasing in taste. Since the container prior to opening is commonly transported and stored for long periods of time at room temperature or higher, and then subjected to chilling conditions, it is necessary that the contents withstand such storage without change.

Fermented malt beverages such as beers, ales, and the like are produced by the fermentation with yeast of worts obtained from mashes of barley malt and grains. After fermentation, the beers so obtained are carried through various operations such as cold storage, carbonation, filtration, etc., in order to obtain the clear carbonated beverage ready for packaging. During the brewery operations, the beer is subjected to a process step known in the trade as chillproofing.

When beers are subected to low temperatures, as occur, for example, during conventional refrigeration and these beers have not been chillproofed, a haze or turbidity forms in the beer as a consequence of the presence of high molecular weight, protein-like compounds and protein-complexes involving carbohydrates, phenols, tannins, etc. that tend to become insoluble when the temperature is reduced. Chillproofing is a step in the brewing process that produces a beer which will remain clear and brilliant at low temperatures. The chillproofing process was introduced to the art of brewing many years ago when the value of proteolytic enzymes for such use was first demonstrated.

One common method of chillproofing comprises treating the beer or ale after fermentation with certain proteolytic enzymes. During the next phase, or pasteurization, the enzymatic activity is accelerated to prevent formation of haze-producing complexes. A residual enzymatic activity remains after pasteurization together with peptide residues. Tannins remain essentially unaltered. The enzyme papain is commonly used for chillproofing. While it has successfully chillproofed millions of barrels of beer, it is not necessarily the best material for that purpose, and indeed the general process of enzyme treatment of such beverages frequently introduces undesirable contaminants.

Deleterious factors, such as oxidation and the presence of traces of metals, may adversely affect the shelf-life of beer not only because of well-known reactions with beer constituents to produce unstable compounds causing hazes and sediments, but also because of inactivation by further reactions of the enzymes surviving the pasteurization process of the final package. The inactivation action or reaction of the oxygen and metals on or with the enzymes may not be direct but through an intermediate action on certain oxidizable components present in beer. These compounds may form complexes or chelates with the trace metals which readily become highly oxidized to form oxygen donors which then react in turn with the enzymes.

During the course of such oxidation, these complex systems may become insoluble and contribute to the formation of hazes and turbidities and moreover adversely affect desirable foaming characteristics.

In addition to contributing to the physical instability, residual enzymes may also adversely affect flavor stability by the same mechanism, since it is well-known that certain oxidation products possess highly undesirable flavor characteritsics.

In the past, chillproofing enzymes (e.g., papain) have been added to the beer in the form of dry, comminuted solids alone or in admixture with other solid materials. (See U.S. Pats. 995,820; 995,823; 2,077,448 and 2,077,449.) More recently, liquid forms of proteolytic enzymes, alleged to have certain advantages, have become available for such use. (See U.S. Pat. 3,095,358.) All of the forms of proteolytic enzymes previously employed, and the procedures for their use in the chillproofing of beverages, have been attended by disadvantages of the type previously cited.

Other methods of chillproofing beer are known, such as the adsorption and removal by filtration of the chill-haze substances using materials such as bentonite, polyvinyl-pyrrolidone and nylon. Neither the proteolytic enzymes nor adsorption materials mentioned above are the most ideal chillproofing materials, since they generally result in inactivation or removal of only portions of haze-producing and destabilizing components.

It has now been discovered that a heretofore unrecognized chillproofing system resides in the employment of selected insoluble basic polymer products providing strong and selective sorption and thereby otbaining removal of haze-forming components to a degree heretofore unattainable, yielding products with exceptional chill-haze and long-term aging stability. These polymer products comprise certain basic, cationic or ampholytic moieties incorporated into the polymer molecule. The products are constituted so as to be insoluble in aqueous media, thus permitting them, together with the sorbed chill-haze impurities and metals, to be readily removed by simple filtration. Such insolubilization also permtis these products to be particularly useful when incorporated into standard filter media, packed columns, etc.

Since much colloidal matter in aqueous suspension is negatively charged, these products have unsual binding capacity for the components of beverages which subsequently can lead to haze formation. This invention is based upon preparation of polymers and their derivatives with control of parameters including charge density and charge distribution at selected pH values representing those to be encountered in the beverage treatment. Control of these parameters enables one to specifically bind undesirable components.

Binding of such components is further enhanced by strong hydrogen and hydrophobic bonding potential introduced by these polymers. This bonding is unusually efficacious, since certain undesirable components (e.g., tannins) may be more tightly and selectively bound and ease of removal by rapid filtration processes can be fostered by control of these factors. Gradations of bonding strengths and selectivity of bonding can be achieved by suitable selection of polymer. In a number of cases, such bonding is favored by use of a polyampholyte, i.e., a polymer containing both basic and acid groups, ionized or unionized (all or in part).

It has been found that heating bottled beer for successive time periods at 35–36° C., cooling to 0–4° C. for 24 hours, and optically measuring haze constitutes a reproducible test method. (Official Methods of Analysis, Association of Official Agricultural Chemists, 1965, 144–153.) Using untreated beer as control, the value of chillproofing material can be established with a fair degree of accuracy, even though the amount of turbidity produced in untreated beers may vary somewhat with the specific product under investigation, mainly due to variations in production procedures and raw materials employed by different breweries.

As previously indicated, the compositions of haze-forming complexes vary in their chemical nature. To prevent build-up of these complexes, a multiplicity of specific sorption activity is frequently useful. In such cases, sequential sorption treatments, either batchwise or in separate filters in the fluid stream may be employed. This may also be accomplished in some cases by physical admixture in a one-step process. In selected cases, it may also be desirable to combine enzymatic treatment with sorption techniques, either prior to or subsequent to sorption treatment with the subject polymers. In such cases, proteases, carbohydrates, phenolic oxidases, and/or tannases can be useful either individually or more particularly in combinations, dependent upon the dominant compounds making up the haze. If an adjunct enzyme treatment is selected, however, it is preferable that insoluble enzyme products, i.e., polymer-enzyme products, be employed.

The exact form in which the insoluble basic polymer products used in the invention are employed is immaterial. The resins suitable for the practice of this invention may be insolubilized by any one of several methods including: (1) cross-linking via incorporation of a multifunctional monomer during polymer formation (e.g., copolymerization of maleic anhydride and hydrocarbon olefin, in the presence of a crosslinking agent such as a compound containing two olefinic double bonds, such as divinylbenzene, vinylcrotonate, poly-1,2-butadiene or alphaomega-diolefins. The quantity of crosslinking agent regulates the crosslink density of the final product and will vary with the degree of insolubility desired); (2) incorporation of polyfunctional amines, alcohols, etc. during derivative formation, e.g., preparation of the three-dimension polymer network by treatment with difunctional or polyfunctional amines such as crosslinking of dibasic acid/ $C_2$–$C_{18}$ monoolefin copolymers with 1–4 mole percent of hexamethylenediamine under conditions resulting in formation of di-imide crosslinks, the degree of crosslinking being determined by selection of the amount of diamine. Any of these methods of insolubilization enables one to achieve complete removal of the treating polymer and any products sorbed thereto.

The insoluble treating agent of this invention can be advantageously introduced into the brewing process at any of several stages. It can be added at the end of fermentation or to the ruh beer prior to or during low temperature storage, in which case the objectionable precursors of haze are sorbed for later removal by filtration. The treating agents may also be employed in treatment of beer by pumping of storage beer through a filter-type unit containing the insoluble polymer products. If a concurrent enzyme treatment is being utilized, such units are preferably maintained at a temperature consistent with both optimum sorption and optimum enzyme activity. The treated and filtered beer is then cooled, if necessary, bottled and, where desired, pasteurized in accordance with procedures known to the art. The invention is applicable to the various malt beverages including beers and ales and to other non-distilled alcoholic beverages including wines, syrups, cordials, liqueurs, fruit brandies, etc.

Polymeric reactant-crosslinking-water-insolubility

It is understood that, according to and for the purposes of the present invention, in order to achieve the desired basic or cationic character, a substantial number (e.g., about 35–100%) of the polymer units as hereinafter defined include free amine, protonated amine or quaternary ammonium groups. The remaining polymer units may be non-functional relative to charge. They may exist in the form imparted by the original polymerization or may consist of forms originating therefrom by exposure to various buffered aqueous media which they may encounter in processing and use. They may consist of carboxyls, hydroxyls, halogens, mercaptans, amines, nitriles, etc. Additionally, such groups as the foregoing are advantageously modified at times by procedures including esterification, amidation, etc.

The initial polymer, which may be modified when necessary as described below to comply with requirements for basic groups, may advantageously be EMA or an EMA-type polymer.

Among the EMA-type polymers suitable for the practice of the instant invention, subject to the previously noted requirements for crosslinked product, are polymeric polyelectrolytes having units of the formula $$\left[ -Z-\underset{\underset{X}{\overset{\overset{O=C}{|}}{|}}}{C}R_A-(CH_2)_q-\underset{\underset{Y}{\overset{\overset{C=O}{|}}{|}}}{C}R_B- \right]_n$$

where: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene) of 1 to 18 carbon atoms, preferably a bivalent carbon chain of 1 to 4 carbon atoms inclusive which is a part of a unit containing 1–18 carbon atoms, inclusive, $q$ is zero or one, X and Y are selected from hydroxy, —O alkali metal, OR, —OH—$NH_3$, —OH—$R_3N$, —OH—$R_2NH$, —OH—$RNH_2$, —NRR', —$(Q)_p$—W—$(NR'R')_x$ and —$(Q)_p$—W—$(—OH)—_x$, providing at least about 35% of X+Y moieties are basic or cationic, wherein $x$ is 1 to 4 and $p$ is zero or one, wherein R is selected from the group consisting of alkyl, phenylalkyl, or phenyl, in each case of 1 to 18 carbon atoms, wherein R' is H or R, wherein Q is oxygen or —NR'—, and wherein W is a bivalent radical preferably selected from lower-alkylene, phenyl, phenylalkyl, phenylalkylphenyl, and alkylphenylalkyl having up to 20 carbon atoms, X and Y taken together can be oxygen or —NR—, —N—W—$(NR'R')_x$ or

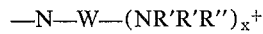

wherein R, W, R' have the meanings previously assigned and R" is alkyl of 1 to 18 carbon atoms, benzyl or aromatic-substituted benzyl.

Many of these polymers, suitable for the practice of this invention or suitable after conversion to derivatives as described, are commercially available. Such polymers containing the requisite basic or cationic groups, are hereinafter referred to as basic-EMA-type polymers.

A preferred type of initial polymeric material, which may if necessary be modified to be included in the basic-EMA-type class, is the polymer of an olefinically unsaturated polycarboxylic acid or derivative with itself or in approximately equimolar proportions with at least one other monomer copolymerizable therewith. These polycarboxylic acid polymers can be of the nonvicinal type including those containing monomer units such as acrylic acid, acrylic anhydride, methacrylic acid, crotonic acid or their respective derivatives, including partial salts, amides and esters or of the vicinal type including maleic, itaconic, citraconic, α-dimethyl maleic, α-butyl maleic, α-phenyl maleic, fumaric, aconitic, α-chloromaleic, α-bromomaleic, α-cyanomaleic acids, including their partial salts, amides and esters. Anhydrides of any of the foregoing acids are advantageously employed.

Co-monomers suitable for use with the above functional monomers include α-olefins such as ethylene, propylene, isobutylene, 1- or 2-butene, 1-hexene, 1-octene, 1-decene, 1-dodecene, 1-octadecene, and other vinyl monomers such as styrene, α-methyl styrene, vinyl toluene, vinyl acetate, vinyl chloride, vinyl formate, vinyl propionate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer with dibasic acid derivatives. The polybasic acid derivatives can be copolymers with a plurality of co-monomers, in which case the total amount of the co-monomers will preferably be about equimolar with respect to the polybasic acid derivaties. Although these copolymers can be prepared by direct polymerization of the various monomers, frequently they are more easily prepared by an after-reaction modification of an existing copolymer. In any event, major modifications of polymer are made when necessary to ensure the presence of 35 percent or more of such groups which bear a basic or cationic moiety.

The initial copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines or ammonia. Other suitable derivatives of the above polymers include the partial alkyl or other esters and partial amides, alkyl amides, dialkyl amides, phenylalkyl amides or phenyl amides prepared by reacting carboxyl groups on the polymer chain with the selected amines or alkyl or phenylalkyl alcohol as well as amino esters, amino amides, hydroxyamides and hydroxy esters, wherein the functional groups are separated by lower-alkylene, phenyl, phenylalkyl, phenylalkylphenyl, or alkylphenylalkyl or other aryl groups.

In the formation of the requisite basic or cationic units, particularly useful derivatives are those in which carboxyl groups are partially replaced, within the defined limits, with moieties bearing amine or amine salts, including quaternary salt groups. These are conveniently formed by reaction of the carboxyls of their anhydride precursors, where applicable, with polyfunctional amine such as dimethylaminopropylamine or dialkylaminoalcohols such as dimethylaminoethanol, the former forming an amide linkage with the polymer or in certain cases at higher temperatures forming an amide linkage with vicinal carboxyls, and the latter forming an ester linkage. Such pendant free amine groups can then be converted, if desired, to their simple or quaternary salts. Suitable selection of the above derivatives permit control of several parameters of sorption performance for the practice of the instant invention.

Further, as already indicated, for the polymers employed to have the desired basic or cationic character, a substantial number (e.g., about 35-100%) of the polymer units contain basic or cationic groups. Such products are further illustrated by the following general examples.

Partial imides of a starting carboxyl or carboxylic acid anhydride containing polymer, e.g., EMA, are produced by:

(A) Heating a limiting amount of a primary, secondary, or tertiary aminolower-alkylamine with a water solution of the hydrolyzed or carboxyl-containing form of the polymer in vacuo at a temperature of about 140–150° C. util a constant weight has been reached and water is no longer given off. Such a reaction simultaneously results in formation of imide groups in proportion to the amount of amine added and in the reformation of anhydride groups for the remainder of the polymer units. In this manner, imide-polymer products are formed which possess 35-100% imide linkages, the remaining carboxyl groups, when present, being in the anhydride form.

(B) Alternatively, a partial amine-polymer product may be converted to the partial imide polymer product by heating a partial amide-polymer product in vacuo at 140–150° C. until water is no longer given off. Such an imide polymer product likewise possesses comparable proportions of imide and anhydride groups depending upon the number of amide groups originally contained in the starting partial amide-polymer product.

Partial primary, secondary or tertiary aminolower-alkylamides of the starting carboxyl or carboxylic acid anhydride-containing polymer, e.g., EMA, are obtained by contacting the polymer with a limiting amount of the selected amine in suspension in a solvent such as benzene or hexane, resulting in formation of a partial amide-anhydride derivative of the polymer, or a corresponding amide-carboxylate derivative thereof. The number of amide groups is dependent upon the quantity of the amine used as compared with the quantity of polymer employed. Such amide-polymer products comprise 35-100% amide groups, with remaining carboxyl groups being present as anhydride groups.

Partial aminoester-polymer products are most conveniently prepared by heating at reflux temperatures overnight a limiting quantity of the selected aminoalcohol and carboxyl or carboxylic acid anhydride containing polymer, e.g., EMA, in a dry organic solvent such as toluene or dimethylformamide and with the optional use of an acidic or basic catalyst such as p-toluene-sulfonic acid or sodium alkoxide. The resulting product contains ester groups, carboxylic acid groups and anhydride groups, the respective numbers of which are determined by the quantity of aminoalcohol used in the reaction compared to the amount of polymer employed and, in some cases, by the temperature at which the reaction is carried out.

Suitable blocking and unblocking of the amine moiety of the reactant employed in preparing amides, esters or imides may be effected when required. Residual, non-modified, polymer units may optionally be converted to neutral groups or units by attachment to the polymer molecule of compounds including alkylamines, aminoalcohols, and alcohols.

Alternatively, the cationic character of the polymer can be provided through incorporation of monomers which impart a basic or cationic character such as C-vinyl pyridines, vinyl amine, the several amino-substituted vinyl benzenes (or toluenes, etc.), amine-bearing acrylates (or methacrylates, etc.), vinyl imidazole, etc.

Thus, in any event, the polymer product, after provision for sufficient crosslink units to provide requisite insolubility in aqueous media, will have residual active or reactive groups which may be of various types, but these residual active or reactive groups or residual "reactive sites" in the polymer will in one way or another comprise a certain percentage, about 35-100%, preferably about 60-100%, which are of a basic or cationic nature, so as to impart the requisite basic or cationic nature to the polymer product.

Representative dibasic acid or anhydride-olefin polymers, especially maleic acid or anhydride-olefin polymers, of the foregoing type (EMA-type) are known, for example, from U.S. Pats. 2,378,629, 2,396,785, 3,157,595, and 3,340,680. Generally, the copolymers are prepared by reacting ethylene or other unsaturated monomer or mixtures thereof, as previously described, with the acid anhydride in the presence of a peroxide catalyst in an aliphatic or aromatic hydrocarbon solvent for the monomers but nonsolvent for the inter-polymer formed. Suitable solvents include benzene, toluene, xylene, chlorinated benzene and the like. While benzoyl peroxide is usually the preferred catalyst, other peroxides such as acetyl peroxide, butyryl peroxide, di-tertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 10,000, preferably about 100 to 5,000, and a molecular weight of about 1,000 to 1,000,000, preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. The product is obtained in solid form and is recovered by filtration, centrifugation, or the like. Removal of any residual or adherent solvent can be effected by evaporation using moderate heating. Numerous of these polymers are commercially available. Particularly valuable copolymers are those derived from ethylene and maleic anhydride in approximately equimolar proportions. The product (EMA) is commercially available. It is also available in various molecular weights, e.g., EMA-11, 21 and 31, respectively, having molecular weights of about 2,000–3,000, 20,000–30,000, and 60,000–80,000, any of which may be used for preparation of products employed in the present invention, since insolubilization by crosslinking leads to an infinite molecular weight product.

The maleic anhydride copolymers thus obtained have repeating anhydride linkages in the molecule, which are readily hydrolyzed by water to yield the acid form of the copolymer, rate of hydrolysis being proportional to temperature. In view of the fact that the sorption of chill-forming components is carried out in aqueous media, any residual anhydride which may remain after formation of the basic or cationic derivatives is usually converted to the acid form or to the respective salt form either prior to or during treatment. Alternately, these residual groups may be in their anhydride form at time of treatment or may be converted to any of several derivatives as described previously.

The term "water-insoluble," as already stated, when applied means that the product concerned does not dissolve in water or aqueous solutions, even though it may have such characteristics as a high degree of swelling due to solvation by water, even to the extent of existence in a gel form. "Water-insoluble" products can be separated from the media by methods including filtration, centrifugation, or sedimentation. Such chracteristics are imparted by crosslinking as previously described. The degree of crosslinking, i.e., crosslinking density, relates to the percentage of interchain linkages relative to the total functional units of the polymer. It is an important variable governing the properties and performance of the three-dimensional crosslinked network. Parameters related thereto include the surfaces available for sorption and the flow rates achievable in a packed-column filtration operation. It is generally desired that sufficient crosslinking be introduced to assure freedom from undesirable plugging of filter media and not so dense as to unduly limit surfaces available for sorption. In general, percentages of crosslinker giving compositions operable in percent of the total polymer units and preferably in the the instant invention are in the range of 0.5 to 10 mole range of 1–4 percent.

Preferred polymers are selected from the group consisting of basic or cationic ethylene/maleic anhydride copolymers
basic or cationic isobutylene/maleic anhydride copolymers
basic or cationic 2-methyl-pentene-1/maleic anhydride copolymers
basic or cationic styrene/maleic anhydride copolymers
basic or cationic vinyl methyl ether/maleic anhydride copolymers
basic or cationic vinylacetate/maleic anhydride copolymers
basic or cationic divinylether/maleic anhydride cyclocopolymers
basic or cationic $\alpha$-methylstyrene/maleic anhydride copolymers
basic or cationic polymaleic anhydride polymers
basic or cationic polyacrylic anhydride polymers
basic or cationic polyacrylic acid polymers, and
basic or cationic polymethacrylic acid polymers.

The basic polymeric products employed in this invention are particularly useful when employed in filtering devices designed to promote maximum contact consistent with practical throughput. Such devices are preferably maintained at temperatures affording optimum sorption, or in combination treatment with enzyme products at such temperatures as to promote optimum enzymatic activity. Alternately, the insoluble basic polymer, e.g., basic-EMA-type polymer, products are admixed with batches of beverage such as during storage or prior to filtering and bottling. In each case, the polymeric products, together with sorbed haze precursors and other potentially undesirable components, e.g., metals, are removed in the final filtration prior to bottling. A subsequent pasteurization in the capped bottles may also be advantageous.

Optimum sorption of contaminants is favored by control of pH of the media as may be required, based on the nature of the sorbent and material being sorbed. The pH should be such that the insoluble-basic polymers used in the invention are protonated and bear a positive charge, while the contaminants bear a negative charge. Colloidal matter in aqueous suspension commonly bears a negative charge, but pH can be lowered to a degree such that certain contaminant components may lose their negative charge and sorption thus be somewhat impaired. Conversely, pH can be raised to such a degree that certain basic polymer sorbents will not be protonated, in which case sorption may again be somewhat impaired. In the case of beer treatment, the insoluble-basic polymer sorbents are protonated at the pH of beer (i.e., 3–6, usually 4–5) and sorbable impurities, e.g., tannins and metals, bear sufficient negative charge at these pH values to favor excellent binding and sorption. In general, the basic polymers used in the instant invention are efficient in removing chill-haze components, e.g., tannins, and metals from beverages at pH values ranging from pH 3 to about 9.

DESCRIPTION OF THE PREFERRED EMBODIMENTS

The following preparations and examples are given by way of illustration only, and are not to be construed as limiting.

EXPERIMENTAL

Preparation 1.—Insoluble, crosslinked dimethylaminopropylimide (100%) of ethylene/maleic anhydride copolymer Xylene (1 liter) was added to a three-necked, round-bottom flask equipped with reflux condenser, Dean-Stark water trap and stirrer. Methylimino-bis-propylamine (4.0 mole percent by weight of anhydride polymer, i.e., 2.0 moles for 0.5 mole of polymer) was added with stirring. Ethylene/maleic anhydride copolymer (EMA–31, MW ca. 60,000–80,000) (0.5 mole) was sifted into the stirred mixture, and it was then heated to reflux temperature (ca. 140–142° C.) for 2–3 hours to remove water. The product at this stage comprises a three-dimensional crosslinked structure in which 8 mole percent of the anhydrides are involved in the crosslinking reaction.

The mixture was cooled to 100° C. and dimethylaminopropylamine (0.5 mole or 8 percent excess by weight based on remaining anhydride groups) was added dropwise over a ten-minute period. The mixture was returned to reflux for 4 hours or until water ceased to be evolved. It was then cooled, diluted 3:1 with hexane, the supernatant decanted, and the solid product washed twice with 3 liters of hexane. The product was then filtered and dried overnight under vacuum at 60° C. The yield was 93 percent of theory and infrared examination showed the product to be free from both carboxyl and anhydride groups.

This product is referred to hereinafter as the 100 percent dimethylaminopropylimide of ethylene/maleic anhydride copolymer and is abbreviated as follows: EMA·DMAPAI (100%), indicating that essentially 100 percent of the anhydride groups which are not involved in the crosslinking reaction have been converted to the respective imide derivatives. Similar abbreviations apply to the following examples.

Preparation 2.—Insoluble, crosslinked dimethylaminopropylimide (70%) of ethylene/maleic anhydride copolymer The product, insoluble EMA·DMAPAI (70%), in which crosslinking was effected as described in Preparation 1, and in which 70 percent of the remaining anhydride groups are converted to dimethylaminopropylimide derivatives by using the stoichiometric amount of amine consistent therewith, and in which this partial imide formation was accomplished as described in Preparation 1, was prepared. The composition was confirmed by infrared and nitrogen analysis.

Preparation 3.—Insoluble, crosslinked dimethylaminopropylimide (5%) of ethylene/maleic anhydride copolymer This product, insoluble EMA·DMAPAI (5%), was prepared substantially in the manner of Preparation 2 and was characterized by nitrogen and infrared analysis.

Preparation 4.—Insoluble, crosslinked dimethylaminopropylimide (100%) of isobutylene/maleic anhydride copolymer The product, insoluble IBMA·DMAPAI (100%) was prepared as described in Preparation 1, using the copolymer of isobutylene and maleic anhydride (MW ca. 100,000) as the starting polymeric material. The product was substantially free of acid and anhydride groups as indicated by infrared absorption patterns.

Preparation 5.—Insoluble, crosslinked dimethylaminopropylimide (70%) of isobutylene/maleic anhydride copolymer The product, insoluble IBMA·DMAPAI (70%) was prepared in a manner as described in Preparation 2, using the copolymer of isobutylene and maleic anhydride as the starting polymer product. The product was characterized as previously described.

Preparation 6.—Insoluble, crosslinked dimethylaminopropylimide (100%) of 2-methyl-pentene-1/maleic anhydride This product, insoluble MPMA·DMAPAI (100%) was prepared from MPMA (MW ca. 20,000) and characterized substantially as described in Preparations 1 and 4.

Preparation 7.—Insoluble, crosslinked dimethylaminopropylimide (70%) of 2-methyl-pentene-1/maleic anhydride copolymer This product, insoluble MPMA·DMAPAI (70%), was prepared and characterized as described in Preparations 2 and 5.

Preparation 8.—Insoluble, crosslinked dimethylaminopropylimide (100%) of styrene/maleic anhydride copolymer This product, insoluble SMA·DMAPAI (100%), was prepared in the manner of Preparation 1, except that the styrene/maleic anhydride copolymer (MW ca. 40,000) was crosslinked with 4 mole percent of divinylbenzene during its preparation and prior to reaction with dimethylaminopropylamine.

Preparation 9.—Insoluble, crosslinked dimethylaminopropylimide (20%) of styrene/maleic anhydride copolymer This product, insoluble SMA·DMAPAI (20%), was prepared substantially in the manner of Preparation 8, using the stoichiometric amount of dimethylaminopropylamine required to produce imide formation with 20 percent of the polymer units not involved in crosslinking.

Preparation 10.—Water-insoluble basic-EMA papain

A solution of 0.5 gram of crystalline papain is suspended in 55 ml. of 0.05 M acetate buffer, pH 4.5, until a clear solution is obtained. The papain solution is added with stirring to a cold (0–5° C.) homogenized suspension of insoluble, basic EMA copolymer (prepared as in Preparation 2) and suspended in 250 ml. of 0.1 M phosphate buffer at a pH of 7.6. The reaction mixture is stirred overnight at 4° C. The insoluble basic EMA-papain derivative is separated by centrifugation and washed thoroughly with 0.1 M phosphate buffer, pH 7.5, and 0.1 M NaCl until the washings are free from enzymatic activity. Finally the product is washed with water to remove the salt and the product is lyophilized to yield 3.4 g. of basic-EMA-papain, retaining 62% of the esterase activity found in the initial crystalline papain.

Preparation 11.—Water-insoluble basic-EMA-Zn-Papain

Crystalline papain (0.1 g.) is dissolved in 60 ml. of a solution containing 0.005 M cysteine and 0.002 M EDTA at a pH of 6, this solution being aged at 37° C. for 15 minutes prior to addition of papain. Zinc chloride (0.125 g.) is dissolved in 10 ml. of 0.005 M tris (tris-hydroxymethyl-aminomethane) buffer at pH 8.0 and added to the papain solution. Excess zinc and chloride ion are then removed by exhaustive dialysis against 0.005 M tris buffer and then against 0.005 M phosphate buffer. This product is used without isolation to attach it to the basic-EMA copolymer prepared in Preparation 2. Lyophilization of an aliquot indicates a yield of Zn-papain of 77%.

The basic-EMA-Zn-papain is prepared by chilling a volume of the Zn-papain suspension containing 12 mg. of the zinc salt to 0° C. and adding 60 mg. of the basic-EMA copolymer of Preparation 2, suspended and swollen in dimethylsulfoxide (5 ml.), to the chilled Zn-papain with vigorous stirring. The mixture is then stirred overnight at 4° C. and the product is recovered by centrifugation followed by washing with water.

Prior to use in chillproofing of beverages, the Zn is removed by treating a suspension with a solution containing cysteine and ethylenediamine tetraacetic acid (EDTA). The product upon removal of the Zn possesses 72% of its initial esterase activity. The insoluble basic-EMA Zn-papain can be used in treating beverages without removal of the Zn with a somewhat lower activity, possibly aided by partial removal of Zn by components of the beverage.

Preparation 12.—Insoluble basic-EMA/*B. subtilis* neutral protease

Insoluble basic-EMA neutral protease (as isolated from *B. subtilis*, strain AM) is prepared in a manner substantially the same as described in Preparation 10. Optimum activity for the insoluble enzyme product is found at 1–2 pH units lower than that for the pure neutral protease.

Preparation 13.—Insoluble, crosslinked dimethylaminopropyl amide-acid (100%) of ethylene/maleic anhydride copolymer Ethylene/maleic anhydride copolymer (0.5 mole) is cross-linked with methylimino-bis-propylamine as already described in the first part of Preparation 1. To the crosslinked polymer in xylene solution is added the dimethylaminopropylamine (0.5 mole or 8 percent excess for formation of the amide-acid groups from the remaining anhydride groups). This mixture is held, with stirring, at 90–100° C. for 4 hours. The product is isolated by dilution with an equal volume of hexane, decantation, two washes with 3 liters of hexane, and drying in a vacuum oven at 60° C. for 18 hours. Infrared analysis of the product indicates that substantially all of the anhydride groups, which are not involved in the crosslinking reaction, are converted to the dimethylaminopropyl-amide-acid derivatives. This product is henceforth referred to in abbreviated form as Insoluble EMA·DMAPAA (100%).

Preparation 14.—Insoluble, crosslinked dimethylaminoethyl half-ester of ethylene/maleic anhydride copolymer Ethylene-maleic anhydride copolymer (0.5 mole) is crosslinked with methylimino-bis-propylamine as in Preparation 1. To the crosslinked polymer, suspended in toluene, is added 0.5 mole of dimethylaminoethyl alcohol (this is an 8 percent excess for formation of the half-ester, half-acid derivative). An acid catalyst (p-toluenesulfonic acid, 0.1% by weight of polymer) is added and the mixture heated with stirring to 90–100° C. for 18 hours. The half-ester product is isolated by pouring the suspension slowly into hexane, washing by decantation three times with 3 liters of hexane per washing, and drying in a vacuum oven at 60° C. for 24 hours. Infrared studies indicate that the product is essentially free from residual anhydride groups and nitrogen analysis indicates substantially complete conversion to the half-ester form. This product is henceforward referred to in abbreviated form as insoluble EMA·DMAE-half ester (100%).

Preparation 15.—Insoluble, crosslinked dimethylaminopropyl diamide (100%) of ethylene/maleic anhydride copolymer EMA·DMAPAA (100%), the product of Preparation 13 (0.5 mole), is dissolved in water as a 5% solution. Dimethylaminopropylamine (0.55 mole) is reacted with the polymer solution after first activating the residual carboxyl groups by adding a water-soluble carbodiimide, 1-ethyl-3-(3 - dimethylaminopropyl)-carbodiimide (0.55 mole) and stirring for about 5–10 minutes prior to addition of the amine. The reaction is carried out with stirring for 4 hours at room temperature. The product is converted to its protonated form by lowering the pH to the range of 2–4 and is recovered from solution by precipitation in acetone. The product is washed with acetone and dried in a vacuum oven at 60° C. for 24 hours. This product is substantially the diamide derivative of residual anhydride (or amide-acid) units (i.e., of those not involved in crosslinking) as indicated by nitrogen analysis and infrared absorption patterns. It is abbreviated as insoluble EMA·DMAPA-diamide (100%).

Preparation 16.—Insoluble, crosslinked dimethylaminoethyl half - ester, dimethylaminopropyl half - amide (100%)

EMA·DMAE-half-ester (100%), the product of Preparation 14 (0.5 mole), is converted to the ester-amide derivative in a manner substantially as described for such amide formation in Preparation 15. The final product, EMA·DMAE-half-ester, DMAPA–half-amide (100%), represents conversion of residual anhydride groups of the original maleic anhydride copolymer into the half-DMAE ester, half-DMAPA amide, with substantially all of such groups being so converted as indicated by nitrogen analysis and infrared absorption.

Preparation 17.—Insoluble, crosslinked dimethylaminoethyl diester (100%) of EMA

In the manner of Preparation 15, the dimethylaminoethyl diester of EMA–31 is obtained by coupling of dimethylaminoethanol to carboxyl groups of starting crosslinked hydrolyzed EMA–31.

In the same manner, other amines may be used to impart basic or cationic character to the polymers of this invention. These include dilower-alkylaminolower-alkylamines, monolower-alkylaminolower-alkylamines, aminolower-alkylamines, dilower-alkylaminolower-alkyl-alcohols, monolower-alkylaminolower-alkyl-alcohols, and aminolower-alkylalcohols. These compounds can be used to modify residual functional groups not involved in the crosslinking reaction to form partial or complete conversion to imides, half-amide half-acid (or salts), diamides, half-ester half-acid (or salts), diester, and any selected mixtures thereof. As previously indicated, such operable derivatives are preferably designed such that a substantial number (e.g., about 35–100%) of the residual polymer units include free amine, protonated amine or quaternary ammonium groups. Within these limits, a number of the polymer units may be converted to non-base or non-cation units (e.g., amides, imides or esters) by reaction with alkyl or aryl amines, alkyl-alcohols, or aromatic-alkyl alcohols.

EXAMPLE 1

Use of insoluble, crosslinked dimethylaminopropylimide (100%) in beverage chillproofing To demonstrate the binding capacity of polymers exemplifying the insoluble basic-EMA-type previously described, beer was treated with crosslinked

IBMA·DMAPAI (100%), Preparation 4. Beer (3.8 kg.), prior to pasteurization, was treated with the above crosslinked polymer (1 g.) by intermittent shaking for a period of 4 hours at 4° C. It was then filtered through a millipore (TM) filter, bottled, pasteurized, and tested for haze formation as previously described. This beer was found to be free of haze-forming compounds as demonstrated by the total absence of chill haze after one week aging at 36° C.

EXAMPLES 2–6

(2) Use of insoluble, crosslinked dimethylaminopropylimide (100%) of styrene/maleic anhydride copolymer in beverage chillproofing.
(3) Use of insoluble, crosslinked dimethylaminopropylimide (20%) of styrene/maleic anhydride copolymer in beverage chillproofing.
(4) Use of insoluble, crosslinked dimethylaminopropylimide (5%) of ethylene/maleic anhydride copolymer in beverage chillproofing.
(5) Use of commercial polyvinylpyrrolidone in beverage chillproofing.
(6) Use of commercial papain enzyme treatment in beverage chillproofing.

In the manner of Example 1, other insoluble, crosslinked EMA-type polymers were tested for their ability to remove beer components leading to chill haze production. These results, including those for Example 1, are shown in Tables I and IV.

TABLE I.—RELATIVE REMOVAL OF CHILL-HAZE COMPONENTS FROM BEER [1]

| Treating agent | Preparation number | Days of aging at 36° C. | | | | | | |
|---|---|---|---|---|---|---|---|---|
| | | 1 | 2 | 3 | 4 | 5 | 6 | 7 | 14 |
| Control | | 268 | 355 | | | | | | |
| Commercial papain enzyme | | 74 | 87 | 88 | | | | 147 | 275 |
| Commercial polyvinylpyrrolidone | | 95 | 102 | 106 | 120 | 123 | 135 | 144 | 193 |
| IBMA·DMAPAI (100) | 4 | 72 | 75 | 72 | 74 | 73 | 73 | 72 | 73 |
| SMA·DMAPAI (100) | 8 | 148 | 169 | 185 | 218 | 218 | 235 | 248 | 302 |
| SMA·DMAPAI (20) | 9 | 207 | 300 | | | | | | |
| EMA·DMAPAI (5) | 3 | 176 | 248 | 367 | | | | | |

[1] All beer was filtered through a Millipore (TM) filter prior to bottling and pasteurized after bottling at 60° C. for 15 minutes. Readings are from a standard hazemeter test after chilling the beer for 24 hours at 0° C. Method as described in Official Methods of Analysis, Association of Official Agriculture Chemists 1965, pp. 144–153.

TABLE II.—RELATIVE REMOVAL OF COLOR BODIES (e.g. TANNIN-METAL COMPLEXES) FROM BEER

| Treating agent | Preparation number | Amount of solids on filter | Color of solids on filter |
|---|---|---|---|
| None | | Very little | Very light tan. |
| Commercial papain enzyme | | do | Do. |
| Commercial polyvinyl-pyrrolidone | | Medium | Light tan. |
| EMA·DMAPAI (70) | 2 | Light | Medium tan. |
| EMA·DMAPAI (100) | 1 | Medium | Light brown. |
| SMA·DMAPAI (20) | 9 | | Do. |
| SMA·DMAPAI (100) | 8 | Very heavy | Dark tan-brown. |
| IBMA·DMAPAI (70) | 5 | Heavy | Medium brown. |
| IBMA·DMAPAI (100) | 4 | do | Dark tan-brown. |
| MPMA·DMAPAI (70) | 7 | Light | Light tan. |
| MPMA·DMAPAI (100) | 6 | do | Medium tan. |

TABLE III.—EFFECT OF BASIC-POLYMER TREATMENT ON COMPONENTS OF BEER

| Treating agent | Preparation number | Iron, p.p.m. | Copper, p.p.m. | N (percent) | Isohumulones, p.p.m. | Color Index |
|---|---|---|---|---|---|---|
| Control | | 0.26 | 0.06 | 0.054 | 13 | 3.8 |
| Commercial polyvinylpyrrolidone | | 0.39 | 0.08 | 0.052 | 13 | 3.7 |
| IBMA·DMAPAI (100) | 4 | 0.09 | 0.01 | 0.054 | 12 | 3.0 |
| SMA·DMAPAI (100) | 8 | 0.06 | 0.02 | 0.052 | 11 | 2.6 |

TABLE IV.—RELATIVE REMOVAL OF CHILL-HAZE COMPONENTS FROM BEER

| Treating agent | Preparation number | Days of aging at 36° C. | | |
|---|---|---|---|---|
| | | 3 | 7 | 14 |
| Control | | >900 | | |
| Commercial papain chillproofing enzyme | | 132 | 218 | 360 |
| IBMA·DMAPAI (70) | 5 | 143 | 187 | 217 |
| IBMA·DMAPAI (100) | 4 | 61 | 63 | 60 |
| EMA·DMAPAI (70) | 2 | 98 | 102 | 146 |
| EMA·DMAPAI (100) | 1 | 86 | 92 | 137 |
| 2-MP-1/MA·DMAPAI (70) | 7 | 222 | 722 | |
| 2-MP-1/MA·DMAPAI (100) | 6 | 89 | 122 | 220 |
| SMA·DMAPAI (100) | 8 | 122 | 153 | 150 |

Test methods used are described in Official Methods of Analysis, Association of Official Agriculture Chemists, 1965, pp. 144–153. Additional results relative to quantity and color of substances (e.g., tannin, etc.) removed by filtration removal of the polymer with sorbed matter are presented in Table II. Further data showing effective removal of iron and copper ions and reduction of color of the final beer are given in Table III. Data is also presented showing effect on protein content (i.e., as shown by percent nitrogen) and isohumulones of these sorption treatments. It is indeed surprising and unexpected to find that the undesirable tannins, metal ions and color bodies are removed with exceptional efficiency, while at the same time the desirable isohumulones and potentially desirable proteins are left behind, thereby permitting one to produce a beer with superior clarity, stability and taste. These data demonstrate that polymers with a high level of basic groups, both polyampholytic and polybasic, are preferred and by far the most effective in chillproofing. It is also observed from data in Table III that effective chillproofing has been achieved by products of the present invention without removal of protein. This can be considered advantageous with respect to retention of foaming properties and certain desirable flavors.

EXAMPLES 7–15

Use of insoluble, crosslinked basic EMA-type polymer-products in beverage chillproofing and comparison with commercial treatments Table IV shows the results of additional chillproofing performance achieved by treatment in a manner described in Example 1 and using the insoluble, crosslinked basic-EMA-type products described in Preparations 1, 2, 4, 5, 6, 7, and 8. These data again confirm the superior performance of these preparations containing higher amounts of basic groups. Best performance was generally obtained with the 100% imide derivatives. However, both the EMA and the IBMA 70% imide derivatives gave good chillproofing performance at least equivalent to commercial treatments.

EXAMPLE 16

Use of insoluble, crosslinked basic EMA-type amide-acid polymer products in beverage chillproofing; insoluble crosslinked dimethylaminopropylamide-acid (100%) of ethylene/maleic anhydride copolymer EMA·DMAPA-acid, Preparation 13, is added to beer at the level of 0.5 gram per gallon of beer. The mixture is intermittently agitated over a period for 2 hours, filtered, bottled, pasteurized and tested for chill-haze and aging stability in the manner previously described. This beer exhibited excellent chill-haze stability with additional observations of lower metal content and enhanced flavor.

EXAMPLE 17

Use of insoluble, crosslinked basic EMA-type half-ester, diamide, and half-ester half-amide products in beverage chillproofing In a manner similar to that described in Example 16, the following polymer products are found to exhibit excellent removal of chill-haze components providing a beer of exceptional stability and flavor:

(a) EMA·DMAE-half-ester (100%), Preparation 14.
(b) EMA·DMAPA-diamide (100%), Preparation 15.
(c) EMA·DMAE-half-ester, DMAPA-half-amide, Preparation 16.
(d) EMA·DMAE-diester (100%), Preparation 17.

EXAMPLE 18

Adjunct treatment combining sorption and enzyme treatments in chillproofing of beverages A basic partial (70%) dimethylaminopropylamine imide, Preparation 5, is reacted with Zn-Papain in the manner described in Preparation 11, with the covalent bonding of the enzyme thereto being through reaction with the remaining anhydride groups of the basic copolymer. This material is activated prior to use by treatment with cysteine-EDTA mixture as described in Preparation 11.

To demonstrate enhanced performance in chillproofing beverages using the adjunct treatment involving both sorption and enzymatic attack, beer (2 gallons) is passed through a column (½" x 24") packed with a 50:50 mixture of diatomaceous earth and IBMA·DMAPAI (100%), Preparation 4. Flow time through the column is approximately twenty minutes. The effluent beer is substantially chillproofed but still contains certain undesirable proteins. The basic enzyme product described in this preparation (0.2% by weight of beer) is added to the beer and the temperature raised to 50–60° C. for a period of 30 minutes. The beer is then cooled, filtered, bottled, and pasteurized. The beer is characterized by freedom from active enzyme content in the bottle (common to commercial enzyme-treated beers), exhibits remarkable resistance to chill haze formation based on accelerated oven-ageing tests, and has superior flavor due to absence of specific proteins and peptides (including enzyme and enzyme degradation products common in commercial enzyme-treated beers).

In exactly the manner of this example, the insoluble basic polymer-enzyme products of Preparations 10, 11, and 12 are employed together with the sorbents of the present invention, to give products of superior quality as indicated in the foregoing. In addition, insoluble anionic polymer-enzyme products, prepared in the same manner as given in Preparations 10, 11, and 12, for example, EMA-Papain, EMA-Zinc Papain, EMA-alkaline and neutral protease and amylase (*B. subtilis* AM enzyme mixture), and like anionic polymer-enzyme products, are also employed in the manner of this Example 18, either alone or together with a cationic polymer-enzyme product, and in any event in combination with a sorbent of the present invention, once again yielding the same remarkable and superior results.

Moreover, it will be obvious that other or additional conventional treatments, whether sorption, enzymatic, or of another type, may be used in combination with the sorption process of the present invention, if desired.

In the manner of chillproofing operations described in the preceding examples insoluble basic polymer products including the amides, imides, esters and mixtures thereof prepared as described using dilower-alkylamino-lower-alkylamines, monolower -alkylaminolower - alkylamines, aminolower - alkylamines, dilower - alkylamino - lower-alkyl-alcohols, monolower-alkylamino-lower-alkyl - alcohols and amino-lower-alkylamino-alcohols are used in chillproofing beverages. The beverage products are found to have superior clarity, oxidative stability, chill-haze resistance and lower metal ion contents.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

We claim:

1. Method for the chillproofing of a beverage by a selective sorption process, with production of a chillproofed beverage possessing superior stability characteristics, characterized by the steps of contacting the beverage at a stage in its production prior to final packaging with an insoluble polymer containing basic or cationic groups, said polymer being polycationic or polyampholytic in nature, and maintaining the insoluble polymer and beverage in contact for a sufficient period to allow sorption of undesirable chill-haze and destabilizing metallic components by the polymer, thereby selectively removing such components from the beverage, wherein the chillproofing is effected using a polymer selected from the group consisting of ethylene/maleic anhydride copolymers,
isobutylene/maleic anhydride copolymers,
2-methyl-pentene-1/maleic anhydride copolymers,
styrene/maleic anhydride copolymers,
vinyl methyl ether/maleic anhydride copolymers,
vinylacetate/maleic anhydride copolymers,
divinyl ether/maleic anhydride cyclocopolymers,
α-methylstyrene/maleic anhydride copolymers,
polymaleic anhydride polymers,
polyacrylic anhydride polymers,
polyacrylic acid polymers, and
polymethacrylic acid polymers, in each case containing basic or cationic groups covalently bound in the molecule, wherein residual reactive sites of the insoluble polymer comprise about 35% to about 100% basic or cationic groups.

2. Process of claim 1, wherein said basic or cationic groups comprise about 60% to about 100% of said residual reactive sites.

3. Process of claim 2, wherein the basic or cationic character of the polymer is due to presence therein of free amine, protonated amine, or quaternary ammonium moieties.

4. Process of claim 3, wherein insoluble basic polymer is recovered and recycled in the process.

5. Process of claim 3 wherein the beverage is a malt beverage.

6. Process of claim 3, wherein the beverage is a fermented malt beverage.

7. Process of claim 3, wherein the beverage is beer or ale.

8. Process of claim 3, wherein the polymer employed is basic or cationic EMA-type polymer.

9. Process of claim 3, wherein the polymer employed is a basic or cationic EMA or IBMA polymer.

10. Process of claim 3, wherein contact of beverage with basic polymer is by adding basic polymer batchwise to the beverage, followed by filtration removal of basic polymer after a suitable contact time.

11. Process of claim 3, wherein the beverage is passed over or through a column containing insoluble basic polymer for purposes of effecting the sorption.

12. Process of claim 3, wherein contact of beverage with basic polymer is effected by means of a filter unit containing the insoluble basic polymer.

13. Process of claim 3, wherein components removed during said sorption treatment of beverage include tannins and metal ions.

14. Process of claim 3, wherein the beverage is an alcoholic beverage and wherein the insoluble basic polymer is contacted with the ruh form of the beverage.

15. Process of claim 3, wherein the beverage is an alcoholic beverage and wherein basic polymer is added to the alcoholic beverage in the ruh stage prior to low temperature storage.

16. Process of claim 3, wherein the beverage is an alcoholic beverage and wherein basic polymer is contacted with the alcoholic beverage in the ruh stage just prior to filtration and bottling.

17. Process of claim 3, wherein the beverage is a fermented malt beverage and wherein insoluble basic polymer is added to the beverage after the fermentation stage and is subsequently removed by filtration.

18. Process of claim 3, wherein the pH range of the beverage treated is 3 to about 9, preferably about 3–6.

19. Process of claim 3, wherein the polymer contains a basic or cationic group selected from the group consisting of mono- and di-loweralkylaminoloweralkyl imide, amide, and ester groups.

References Cited

UNITED STATES PATENTS

| | | | |
|---|---|---|---|
| 2,811,449 | 10/1957 | Witmer et al. | 99—48 |
| 2,847,403 | 8/1958 | Contois, Jr. | 99—48X |
| 3,080,344 | 3/1963 | Walles | 99—48X |
| 3,095,358 | 6/1963 | Meister | 99—48X |
| 3,146,107 | 8/1964 | Elder et al. | 99—48X |
| 3,157,595 | 11/1964 | Johnson et al. | 210—54 |
| 3,282,702 | 11/1966 | Schreiner | 195—63X |
| 3,340,680 | 9/1967 | Fields et al. | 55—22 |

OTHER REFERENCES

Levin et al., A Water-Insoluble Polyanionic Derivative of Trypsin (I) Preparation and Properties. Biochemistry, Vol. 3, No. 12, December 1964 (p. 1905). QP 501 B52.

A. LOUIS MONACELL, Primary Examiner

D. M. NAFF, Assistant Examiner

U.S. Cl. X.R.

99—105, 106